United States Patent [19]

Legris

[11] 4,303,263
[45] Dec. 1, 1981

[54] INSTANT FITTING FOR REINFORCED MULTILAYER FLEXIBLE TUBINGS FOR FLUIDS

[75] Inventor: André Légris, St-Maur, France

[73] Assignee: Societe Legris France S.A., Ozoir-la-Ferriere, France

[21] Appl. No.: 189,647

[22] Filed: Sep. 22, 1980

Related U.S. Application Data

[63] Continuation of Ser. No. 829,569, Aug. 31, 1977, abandoned.

[30] Foreign Application Priority Data

Mar. 9, 1977 [FR] France .................................. 77 06998

[51] Int. Cl.³ ............................................. F16L 33/18
[52] U.S. Cl. ............................... 285/249; 285/323; 285/93
[58] Field of Search .............. 285/249, 248, 250, 259, 285/104, 105, 93, 113, 323, 322, 247, 245, DIG. 12

[56] References Cited

U.S. PATENT DOCUMENTS

| | | | |
|---|---|---|---|
| 3,222,091 | 12/1965 | Marshall | 285/243 X |
| 3,405,957 | 10/1968 | Chakroff | 285/233 X |
| 3,408,099 | 10/1968 | Appleton | 285/259 |
| 3,674,290 | 7/1972 | McNally | 285/248 |
| 3,724,878 | 4/1973 | Ford | 285/94 X |

FOREIGN PATENT DOCUMENTS

| | | | |
|---|---|---|---|
| 1068069 | 10/1959 | Fed. Rep. of Germany | 285/248 |
| 1072028 | 12/1959 | Fed. Rep. of Germany | 285/250 |
| 1095068 | 12/1960 | Fed. Rep. of Germany | 285/249 |
| 1201120 | 7/1959 | France | 285/249 |

Primary Examiner—Thomas F. Callaghan
Attorney, Agent, or Firm—Bucknam and Archer

[57] ABSTRACT

Instant fittings for reinforced multilayer flexible tubings for fluids, comprising a body internally provided with a cylindrical inlet whose diameter is substantially equal to that of the tubing, a bead extending radially inwardly and constituting a gripping ridge followed by a generally conical part, a bore whose diameter is equal to the large diameter of the cone, said conical part being internally provided with a channelled bush on which is engaged the end of the tubing 8. The invention is applied to the connection of multilayer pipes.

10 Claims, 17 Drawing Figures

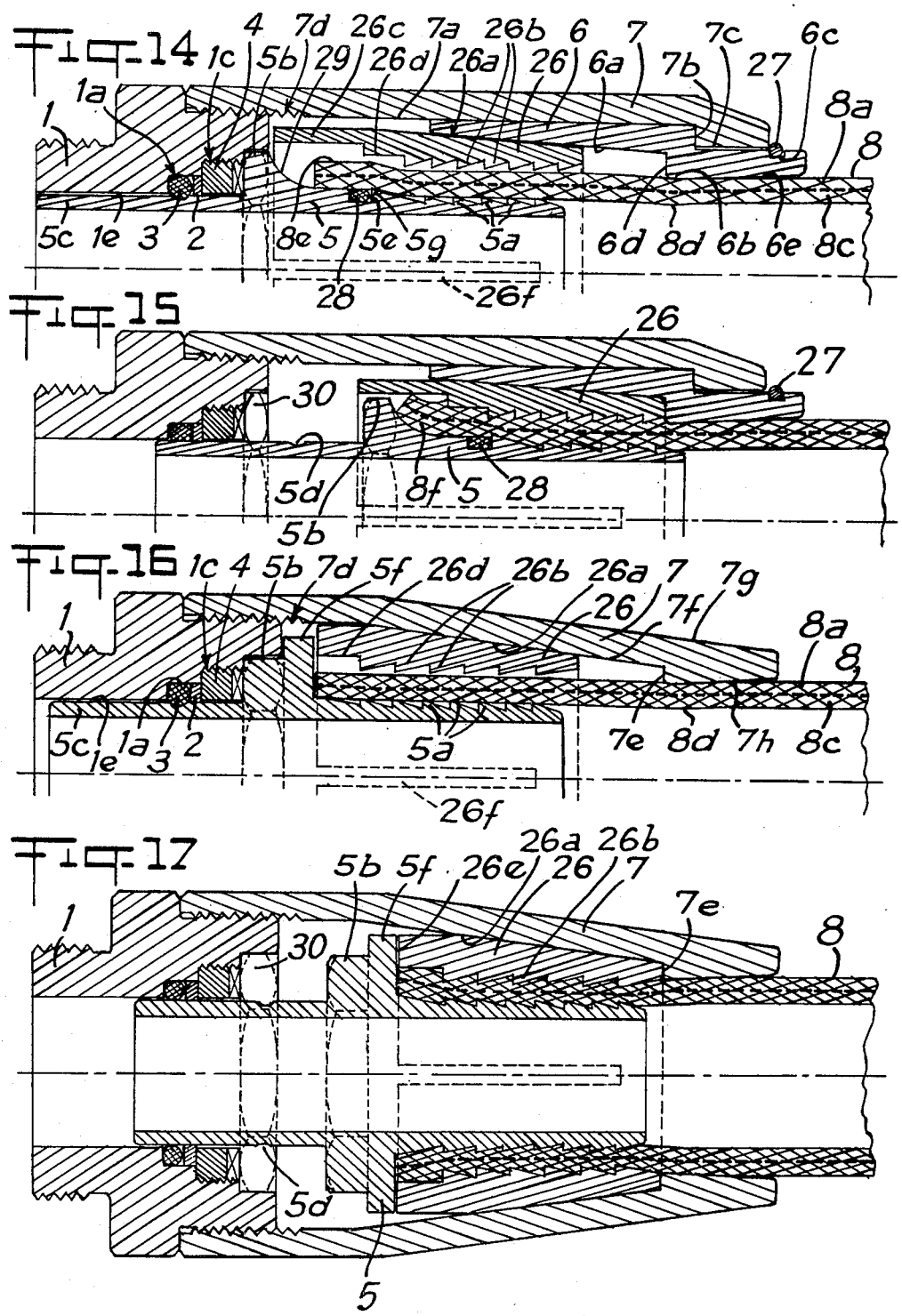

INSTANT FITTING FOR REINFORCED MULTILAYER FLEXIBLE TUBINGS FOR FLUIDS

This is a continuation, of application Ser. No. 829,569, filed Aug. 31, 1977 and now abandoned.

BACKGROUND OF THE INVENTION

The present invention relates to improvements in instant fittings for reinforced, multilayer flexible tubings for fluids.

SUMMARY OF THE PRIOR ART

The fittings according to the present invention are adapted to be used with flexible pipes of the type reinforced by a braided sheath and comprising at least three layers, viz. an inner tube, a braided sheath and a protective wearing layer.

The purpose of these fittings is to effect the virtually instantaneous connection of this type of tubing, with a view to making considerable savings in manpower and to enable such fittings to be made by personnel having no special qualification therefor.

The connection of a reinforced multilayer flexible tubing is presently complicated and often requires bulky equipment, particularly for crimping and in any case the operation is always long, fairly delicate and expensive, and requires specialised and experienced manpower.

Fixing devices are known using a screw, in which the inner part of the tubing is mounted on a bush and the outer layer is strongly compressed under the effect of a tightening due to one of the following effects:

Effect of radial compression, by crimping, by collar, shells or compressed split rings;

Effect of compression obtained by annular rolling of axial type with formation of a retaining bead;

Effect of radial compression made by the extension by forcing of the inner diameter of the tubing under the effect of screwing the inner bush;

Effect of axial annular compression on local swell of the tubing due to a reinforcement of the central bush, by screwing or unscrewing a nut.

It is also known to use devices for direct crimping on the outer wall of the body or indirect crimping of members which are integral with the body.

Devices are also known in which additional members such as annular rings, incorporated with the locking and screwing members enable the screw tightening members to be rotated without the members holding the flexible being able to rotate at the same time.

In certain known devices, the bush supporting the inner wall of the flexible is separated from the body, is detachable, possibly rotatable and sometimes comprises an annular seal between said bush and the body of the fitting.

It is also known to use devices allowing the instant fitting of a tubing simply by coupling said latter in the fitting. These are generally fittings with self-locking means in which a cone cooperates with annular parts self-locking on said cone, constituted by clips or split rings and having teeth for catching on the inner diameter, internally fluted or threaded segments or retaining rings or balls.

Other self-locking devices with radial tightening are also known. However, almost all these self-locking devices with instant fitting are provided for a homogeneous tubing of precise or calibrated dimensions and are not suitable for a multilayer flexible tubing.

In fact, the instant fittings are generally subjected to the pressure at the end of the tubing and their seal is obtained on the outer diameter of the tubing. Therefore, they cannot be suitable for a reinforced multilayer flexible tubing which always requires that the seal be made on the inner diameter and never on the end of the tubing. In fact, if the pressurised fluid arrives at the end of a multilayer flexible tubing, said fluid flows along the wires of the reinforcing braided sheath which is never perfectly embedded and incorporated in the layers of plastomer or elastomer, and causes the outer wearing layer of low resistance to burst at low pressure, rendering the tubing unaesthetic, dangerous and inacceptable to the user.

Among instant fittings, two devices are known for which the seal is made on the inner diameter of the tubing and which would consequently be suitable for multilayer flexible tubings; however, in reality, these two devices have been studied to replace and compete against the instant fittings mentioned above.

They are therefore made for assembly on a semi-rigid, semisupple or supple tube of fairly good calibration and are not suited for multilayer flexible tubings. In particular, the parts supporting the tightening efforts are not sufficient to withstand the considerable forces transmitted by the pressurised fluid and the forces of traction.

It is an object of the present invention to remedy the abovementioned drawbacks by providing an improved fitting intended for reinforced multilayer flexible tubings.

SUMMARY OF THE INVENTION

In accordance with the present invention, the fitting comprises a body internally provided with a cylindrical inlet whose diameter is substantially equal to that of the tubing, a bead extending radially inwardly and constituting a gripping ridge followed by a generally conical part, a bore whose diameter is equal to the large diameter of the cone, said conical part internally receiving a channelled bush on which is engaged the end of the tubing, said bush being extended by a cylindrical or end part, which is engaged in a bore of the body having a groove in which is disposed an annular seal, said bush being axially mobile to come into position of locking in rotation, when the tubing is in penetrated position and in position of tightening of the tubing against the gripping ridge between the rotatable channelled bush and the conical part of the body when the tubing is in position of traction.

The fitting according to the invention enables long, meticulous and expensive assembly operations requiring specialised manpower, to be avoided.

According to a novel feature of the invention, the fitting allows a virtually instant fitting of the multilayer flexible tubings.

Furthermore, the considerable importance of flexibles for fluids under pressure and the increasing part played by servo-controls by means of fluids is realised in industry, this resulting in any improvement in the costs of establishing the fittings of multilayer flexibles rendering the use thereof easier and more current.

The device according to the invention comprises an assembly of members constituting the fitting ready for use and it has an axial cylindrical bore substantially equal to the outer diameter of the flexible tubing.

According to a feature of the invention, a bare flexible tubing is used, without any preparation other than its cut to length, to the exclusion of any other preparation such as removal of the braid, etc.

Fitting consists simply in forcibly pushing the previously lubricated tubing with reciprocating and rotating movements (thrust with alternate sectorial rotations of 90° to 180°) to the end of the fitting. Locking in permanent position of functioning is then effected, either by pulling on the tubing (thus enabling its correct holding to be checked) or by placing it under a sufficient pressure for this locking to be effected automatically.

The fitting presents a self-holding of the tubing and a permanent self-seal due to the pressure itself, and preventing any leakage by creeping or loss of tightening of the tubing in time or as a function of the influences of hot or cold thermal cycles.

The fitting made according to the invention ensures the rotation of the tubing in the fitting, thus avoiding the kinking thereof and enabling the fitting and its tubing to be unscrewed or re-screwed on any apparatus.

The device according to the invention may be made either in the form of independent fittings, or in the form of a complete accessory screwing on the majority of standard fittings available on the market (with cutting ring, compression, collet, flat face, etc.) and transforming said fittings into instant connecting members for multilayer flexible tubing or in the form of an inexpensive, standardised, cylindrical part forming a cartridge, said part being able to be fitted by crimping or screwed and crimped or simply screwed in a very simple, inexpensive body or directly screwed in an apparatus, either in the form of a fitting terminated by a tubular part of internal dimensions equal to those of the tubing and entering directly in one of the conventional known fittings, or in the form of a fitting terminating in a part having forms complementary of a known instant fitting.

The device according to the invention employs a method of checking the correct assembly of the tubing. Different marks printed on the tubing itself allow said tubing to be cut at the suitable spot and the correct length of fit thereof in the fitting to be checked as well as the locking stroke, in order to check the assembly without any loss of time.

Two symmetrical markings are made on the tubing, one on one side for the fit at one of the ends of the tubing and the other on the opposite side for the fit at the other end.

The tubing undergoes reversed stresses of tightening and extension, offset axially during the assembly of the tubing, but these stresses are then combined at one spot by axial displacement of the tubing and the bush to the outside of the tubing up to a permanent position of locking. The axial displacement effects at first a progressive annular radial compression, with wedge effect, of the tubing between the bush and the rotary ring; after a calculated axial stroke, there is then produced a permanent locking due to the limit of compressibility of the tubing and also if need be by means of catching teeth on a ring locking the tubing after a determined axial stroke and compression of the tubing. The compression and locking of the tubing are maintained under constraint by the pressurised fluid which permanently pushes the bush.

BRIEF DESCRIPTION OF THE DRAWINGS

FIG. 14 is a half-view in longitudinal section of an embodiment of a fitting in assembled position;

FIG. 15 is a half-view in section of the same fitting as FIG. 14 in locked position;

FIG. 16 is a half-view in section of another embodiment of the fitting in assembled position;

FIG. 17 is a view in section of the same fitting as FIG. 16 in locked position.

DESCRIPTION OF THE PREFERRED EMBODIMENTS

Figure 1:
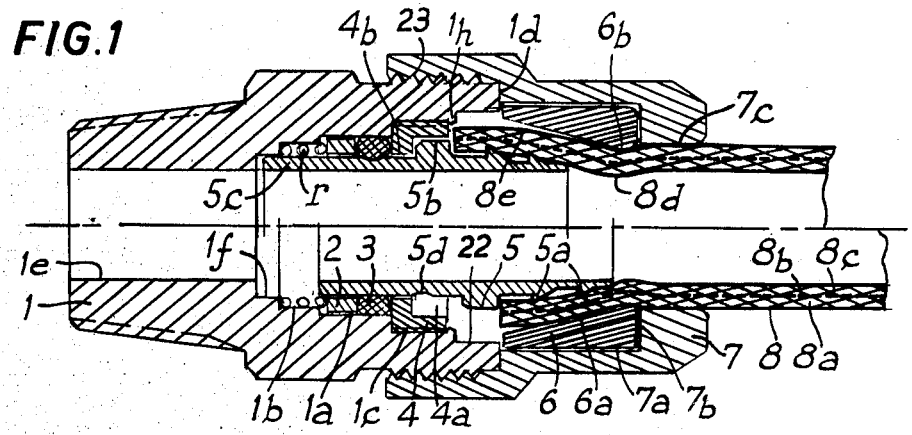
FIG. 1 is a view in longitudinal section of an embodiment of an improved fitting according to the invention, in which the upper half view represents the fitting during assembly of the tubing and the lower half view in locked position.

Referring now to the drawings, FIG. 1 shows a fitting which comprises a body 1 having a threaded part 23 on which is screwed a nut 7 which is in abutment against a shoulder 1d of the body in order to constitute a housing having an inlet bore 7c for a multilayer flexible tubing 8 constituted by at least three layers, viz. a plastics tube 8c, a braided sheath 8b and a wearing layer 8a. After the bore 7c there is provided a cylindrical housing 7a in which is mounted, in free rotation, a ring 6 which is axially held prisoner between the shoulder 1d of the body and a shoulder 7b of the nut.

The rotary ring 6 presents, near the bore 7c, a gripping ridge 6b extending radially inwardly, followed by a generally conical part 6a. After the ring 6, the body has a bore 22 of diameter equal to the large diameter of the cone 6a and a tapped part 1c in which is screwed a ring 4 crimped at 1h and presenting a housing 4a in the form of a hollow hexagon. The ring 4 presents a shoulder against which abuts an O-ring 3 which is held on the opposite side by a ring 2 subjected to the action of a spring r in abutment against the end of a bore 1b provided in the body. Inside the fitting thus defined, there is mounted to slide and rotate a bush 5 having a tubular ferrule 5c guided in a bore 1f of the body, in the rings 2 and 4 and by the O-ring 3 forming seal and cooperating with a shallow groove 5d, said bush comprising in its median part a boss 5b in the form of a hexagon adapted to engage in the hexagonal housing 4a to ensure the locking of the bush 5 in rotation.

At the end opposite the tubular ferrule, the bush 5 has a channelled ferrule having at least two channels 5a on which is engaged the end of the tubing 8. The bush 5 is immobilised in translation by the annular O-ring 3 engaged in the groove 5d of the bush and in rotation by the hexagonal boss 5b adapted to be engaged in the corresponding housing 4a of the ring 4.

The fitting according to the invention is used as follows:

The user having lubricated the end of the tubing 8 on the inside and outside, introduces said tubing into the bore 7c (top half-view of FIG. 1) and pushes it against the gripping ridge 6b of the ring 6 so that the tube is compressed slightly to occupy the position 8b and then it takes its normal diameter again to be engaged on the channelled ferrule of the bush 5 and surmount the sealing channels 5a where it remains seized until the tubing 8 abuts at the end of the fitting on boss 5b of the bush. The fitting on the bush is obtained by alternately pushing and turning the tubing through 90° and 180°. During fitting, the bush 5 is immobilised in rotation and in translation due to the engagement of the hexagonal boss 5b in the corresponding housing 4a integral with the body.

The fitting is then locked, this being obtained by pulling on the tubing either manually or by a sufficient pressure of fluid exerted on the socket 5 which acts as a piston with the O-ring 3. This results in an axial displacement of the bush 5 which comes into the position shown in the bottom half-view of FIG. 1.

The swollen part 8e of the tubing progressively bears on the cone 6a of the ring 6 and the tubing undergoes a gradually stronger radial, annular compression with wedge effect, since it is gripped between the bush 5 and the rotary ring 6.

When the limit of compressibility of the tubing is reached, the axial stroke stops in a position shown in the bottom half-view of FIG. 1.

The pressurised fluid acting on the bush 5 and the O-ring 3, maintains a permanent axial thrust on the zone of seal of the channels, this allowing a constant tightness in time whatever the thermal cycles (within the limits authorised by the seal and the tubing). Ageing and hot creeping are therefore not to be feared.

The assembly constituted by the tubing 8, the bush 5 and the ring 6, may rotate, when the fitting is locked with or without pressure and this avoids any kinking of the tubing on assembly, and enables the fitting to be unscrewed from an apparatus, without dismantling the tubing, and re-assembly. In fact, the bush 5 being disengaged from the hexagonal housing 4a, it is no longer immobilised in rotation and the above-mentioned assembly may be animated by a rotary movement.

As shown in FIG. 1, the spring r, by pushing the ring 2 on the O-ring 3, effects a permanent compensation of the seal of the O-ring. This arrangement is very useful when the extreme variations in temperature are considerable.

The annular seal 3 may present different forms apart from the O-ring shown and it may be constituted in particular by a lipped seal or anti-extrusion washers which can resist high pressures.

Figure 2:
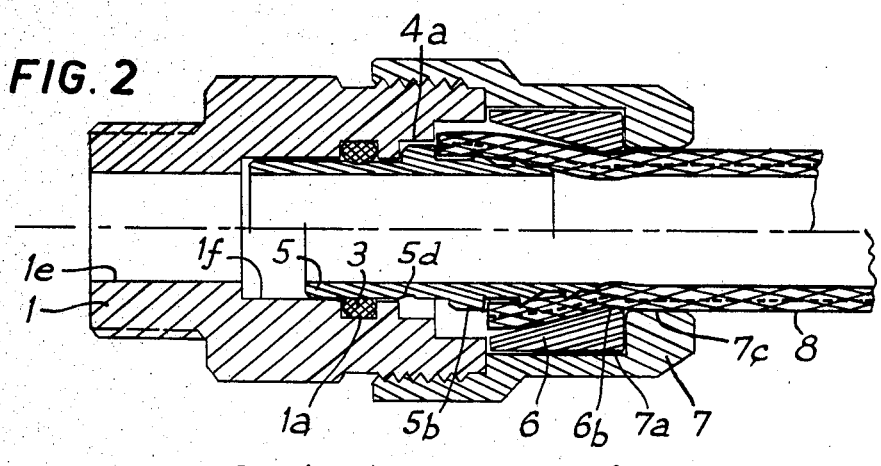
FIG. 2 is a view in longitudinal section of another embodiment of the fitting shown in FIG. 1.

FIG. 2 shows a simplified version of the fitting which does not comprise any elastic compensation by means of a spring on seal 3. The seal 3 is mounted in a groove 1a machined in the body. The hexagonal housing 4a in which the boss 5b of the bush may engage for immobilising the bush 5, is made directly in the body 1.

Figure 3:
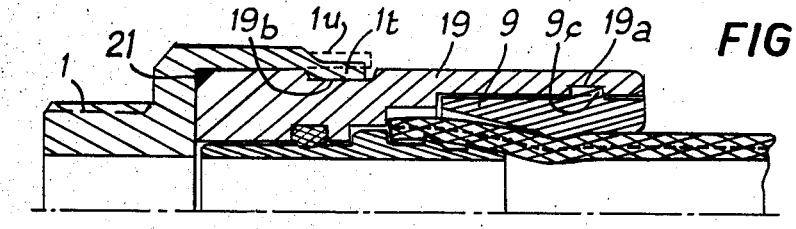
FIG. 3 is a half-view in longitudinal section of another embodiment of the fitting in position of assembly of the tubing.

The fitting shown in its fitted position in FIG. 3 is constituted by an inexpensive, standardised body or cartridge 19, of cylindrical external form, fitted in a bore of a ferrule 1 whose edge 1u is crimped to occupy the position 1t in a groove 19b of the body 19. This body or cartridge 19 may also be screwed and crimped or simply screwed on a ferrule 1 or an apparatus.

A seal 21 may be mounted between the body 19 and the ferrule 1 constituted by an O-ring or a sealed bonding.

Furthermore the rotary ring 9 is made with a flange 9c which is engaged in a groove 19a of the body 19 and it is provided with a slot extending over half of its length, in order to render it elastic and thus to allow it to be forcibly fitted by elasticity in body 19. This assembly of the rotary, ring 9 renders it irremovable and allows it to rotate.

Figure 4:
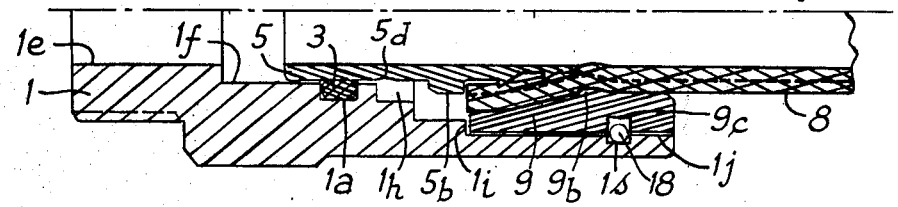
FIG. 4 is a half-view in section of another embodiment in locked position of the tubing.

FIG. 4 shows, in locked position, a fitting which comprises a monobloc body 1 in which is mounted a non-split rotary ring 9, which presents a groove 9c located opposite another groove 1s of the body 1 so as to form a toric housing in which is engaged an elastic retaining ring 18 ensuring the axial locking of the ring 9 but nonetheless allowing rotation thereof.

Figure 5:
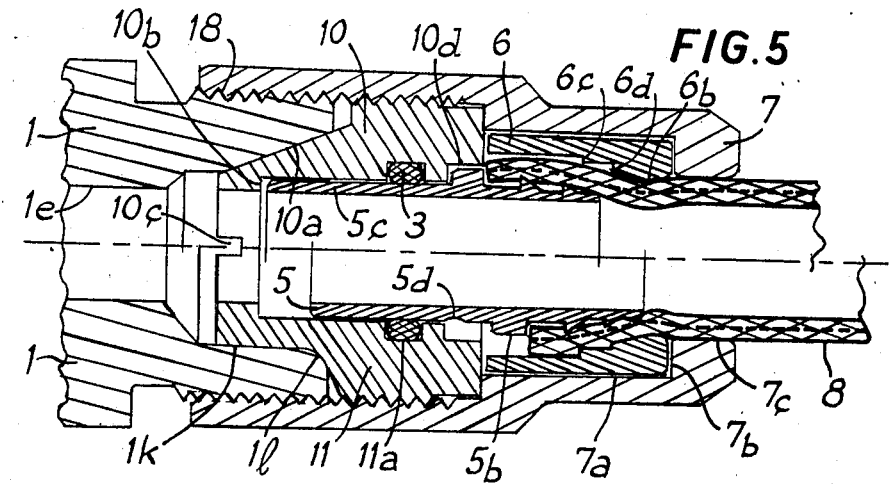
FIG. 5 is a view in longitudinal section of a fitting screwed on a support member.

FIG. 5 is a variant embodiment of the fitting of FIG. 2 which constitutes a complete accessory adapted to be screwed on different known types of fittings to transform them into instant fittings for multilayer tubings.

To this end, a sufficiently long nut 7 is used, screwed on a threading 18 of a body 1 of fitting of known type, said nut 7 internally receiving a screwed sleeve 10 which presents a bore 10b and a hexagonal housing 10d identical to the housing 4a of FIGS. 1 and 2 and of which the shapes in contact with the fitting 1 are complementary thereof. The top half-view of FIG. 5 shows a conical fitting 10a with cutting ring or conical bush. The bottom half-view of FIG. 5 shows a so-called compression fitting with its radius 1l and its guide 1k.

The assembly of parts 10 or 11 of the bush 5 of the seal 3 or 11a of the rotary ring 6 and the nut 7 forms a complete accessory which may be used without modification.

This assembly may be mounted on cutting ring, compression, collet or flat face fittings.

The rotary ring 6 comprises a gripping ridge 6b and a conical part as described hereinabove; however, there are provided on the cone two catching teeth 6c and 6d on which the tubing catches and is locked after determined axial stroke and compression.

Of course, it is possible to provide one or more teeth on the ring 6.

Figure 6:
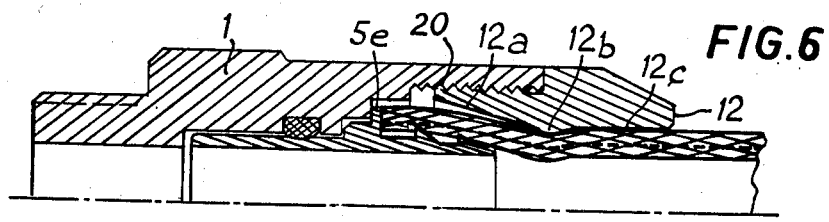
FIG. 6 is a half-view in longitudinal section of another embodiment of a fitting when the tubing is assembled.

FIG. 6 shows a fitting in which the body 1 comprises a tapping 20 in which is engaged a hollow screw 12 which replaces the nut 7 and the rotary ring 6.

In order that the tubing in locked position may rotate in working position, the cone 12a and the gripping ridge 12b are subjected to an anti-adherent surface treatment which replaces the rotary ring 6.

To avoid the bush 5 escaping with the tubing, by an excess of sliding, a flange 5e is provided on the bush 5, so that said flange 5e comes into abutment on the screw 12.

Figure 7:
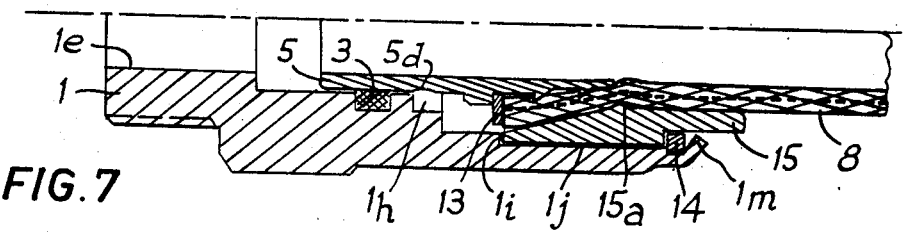
FIG. 7 is a half-view in longitudinal section of another embodiment of a fitting in locked position.

FIG. 7 shows a variant embodiment of the fitting of FIG. 6, in locked position, in which the flange 5e is replaced by a washer 13 abutting on the boss 5b of the bush.

The monobloc body 1 receives a rotary ring 15 held by a washer 14 on which a crimped edge 1m of the body 1 is bent.

Figure 8:
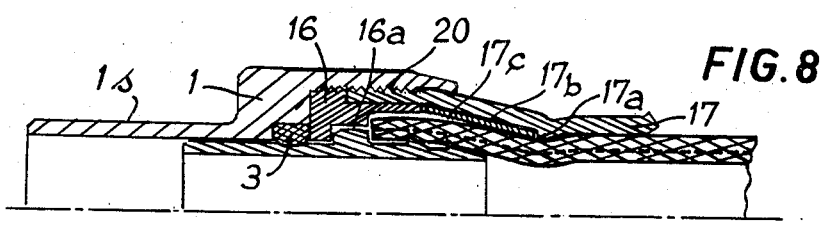
FIG. 8 is a half-view in longitudinal section of another embodiment of a fitting made of sheet metal in fitted position of the tubing.

FIG. 8 shows another embodiment of a fitting in locked position which comprises a tubular end 1s adapted to be fixed in the majority of the known fittings (with cutting ring, compression, etc.)

The body 1 has a tapping 20 in which are screwed a ring 16 having a hexagonal housing 16a adapted to receive the boss 5b of the bush 5 and a piece 17 made from stamped sheet metal. Inside the piece 17 is mounted a rotary piece 17c made of thin sheet metal, guided in the cone 17b and in abutment against the gripping ridge 17a.

Figure 9:
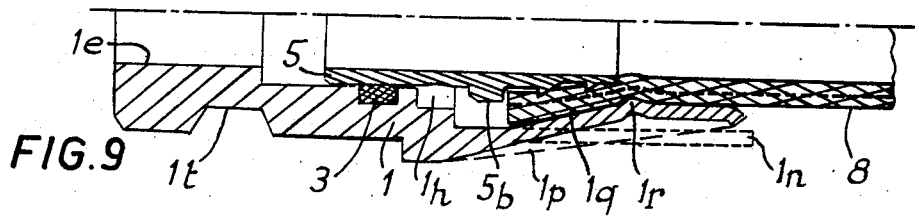
FIG. 9 is a half-view of another embodiment of the fitting with a body in one piece and in locked position.

FIG. 9 shows another embodiment of a fitting in locked position which comprises a monoblock body 1 internally provided with the different bores and housings shown in FIG. 2 which may be made either by turning and boring directly with an outer from 1p and an inner from 1q, or by cutting-off, reserving a thin tubular part 1n adapted to be shaped to present the final form 1q and 1r.

At the other end of the body 1, the general shape is cylindrical with a groove 1t. This shape is adapted for a direct assembly in instant fittings of the female type.

FIGS. 10, 11, 12, 13 show a method of verifying that the tubing has been correctly fitted in the fitting, said method enabling the depth of fit and the locking to be checked.

Figure 10:
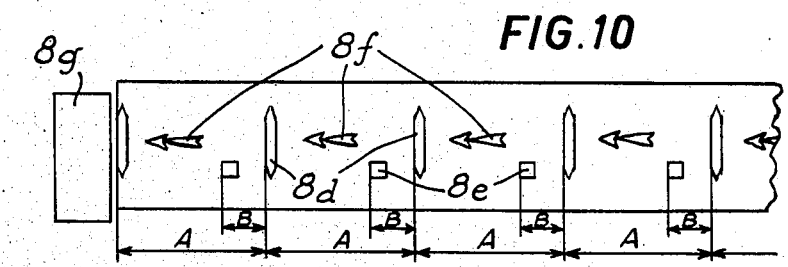
FIG. 10 is a view of the marking on one of the faces of the tubing.
Figure 11:
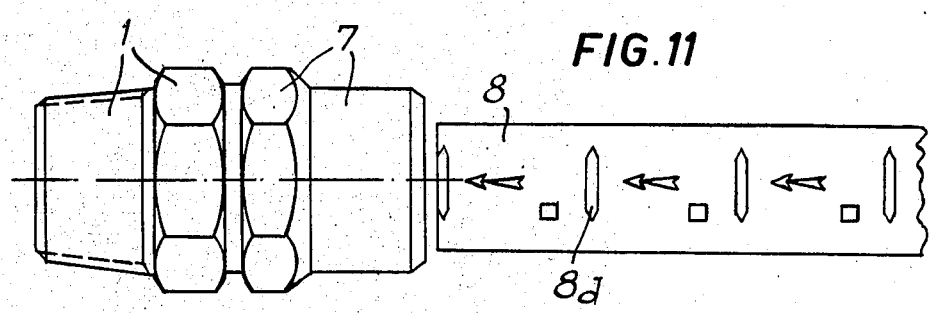
FIG. 11 is a view of the presentation of the tubing for assembly in the fitting.
Figure 12:
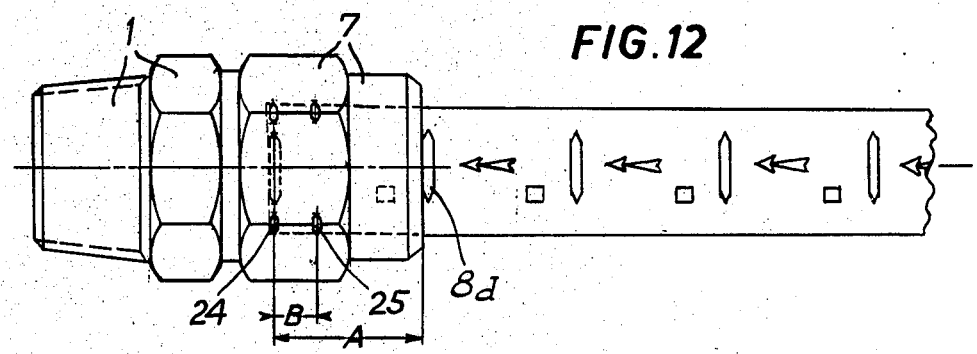
FIG. 12 is a view of the fit of the tubing in the fitting.

FIG. 10 shows a tubing 8 on which are printed several series of marking signs, a first series of arrows 8f indicating the direction of fit of the tubing in the fitting; a second series of transverse lines 8d regularly spaced apart by a distance A which corresponds to the length to be fitted, and a third series of square marks 8e spaced by a distance B from the lines 8d and which gives the stroke of locking.

The same marking is made on the opposite side on the tubing but in the reverse direction for assembling the other end.

When the tubing is to be fitted, it is firstly cut along line 8d as shown in FIG. 10 to separate the unwanted part 8g.

The tubing being internally and externally lubricated, it is fitted as described previously until the line 8d (FIG. 12) is flush with the fitting, so that the fitting is correct and checked.

Figure 13:
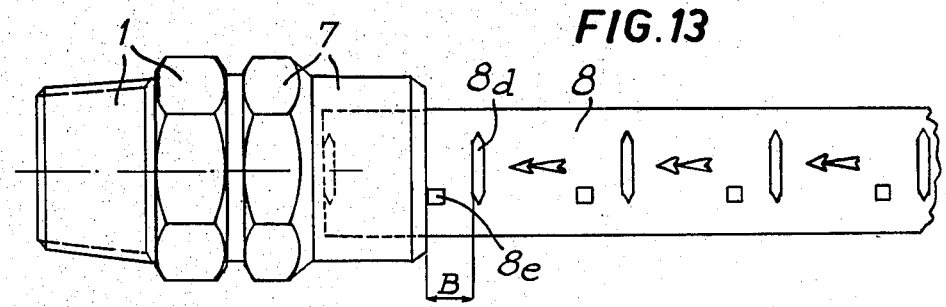
FIG. 13 is a view of the tubing locked in the fitting.

Locking is then effected by pulling on the tubing 8 until the square mark 8e is flush with the fitting 7 as shown in FIG. 13.

This method thus makes it possible to check whether the locked position is correct.

If there is a doubt concerning the assembly, the cycle may be started again by pushing the tubing to check the fit and pulling it to verify the locking thereof.

If the pressure of the fluid is sufficient, locking is effected automatically under the pressure of the fluid; it is then sufficient to check the appearance of the square mark 8e whose stroke B in minimum.

If the tubings do not or could not comprise any marking, it is possible to provide on the outside of the fitting a mark 24 for checking the fit of the tubing and a mark 25 for checking the locking. The user having a non-marked tubing makes the marks on the tubing himself by means of a marking member and using marks 24 and 25 which figure on the fitting to determine the distance A for fit and distance B for locking.

The present invention finds its applications for all multilayer flexible tubings having a sufficient possibility of "tightening" and "extension" for their differences in diameter to be fairly large to permit the automatic manual assembly without excessive efforts.

This type of fitting is used for automobile braking tubing, braided PVC tubings, much used on machines for water, lubricating liquids or coolants (oils, soapsuds, emulsion), used also for sprinkling, for dispensing liquid foodstuff, for compressed air, agricultural treatment and hydraulic servo-control.

However, this fitting device is used with multilayer flexible tubings having a sufficient possibility of tightening and extension for the differences in diameters obtained to allow locking.

However, it has been ascertained that this fitting may be used with tubings of greater rigidity, particularly multi-layer high pressure tubings in which there is little possibility of extension and tightening.

The following embodiment has for its object an improvement in the fitting, enabling tubings of greater rigidity to be used.

The fitting shown in FIGS. 14 and 15 comprises, as in the preceding embodiment, a body 1 on which is screwed a nut 7 having a cylindrical housing 7a in which is mounted a rotary ring 6 which is axially held prisoner between a shoulder 7b of the body and an elastic ring or clip 27 engaged in a groove 6c in the rotary ring.

The rotary ring 6 has an inlet bore 6e of a flexible multi-layer tubing 8, a head 6b forming constriction, extending radially to the outside, followed by a generally conical portion 6a.

Furthermore, the body 1 presents a housing 30 in the form of a hexagon followed by a tapped hole 1c in which is screwed a ring 4 against which abuts an antiextrusion washer 2 and an O-ring 3 disposed in the housing 1a of the body 1.

Inside the fitting thus defined is slidably and rotatably mounted a bush 5 having a tubular ferrule 5c guided over its whole length in a bore 1e of the body, by the O-ring 3, the washer 2 and the ring 4, said bush comprising in its median part a boss 5b in the form of a hexagon adapted to engage in the hexagonal housing 30 to ensure locking of the bush 5.

At the end opposite the tubular ferrule, the bush 5 presents a channeled ferrule having channels 5a and a channel or tooth 5g of larger diameter than channels 5a on which the end of the pipe 8 is engaged.

Following the tooth or channel 5g there is provided a groove 5e in which is mounted an O-ring 28 in contact with the inner surface of the tubing 8. A rounded part 29 provided on the bush 5 between the groove 5e and the boss 5b is adapted to receive the end of the tubing 8 when said latter is tightened, as shown in FIG. 15.

A split ring 26 is interposed between the conical portion 6e of the ring 6 and the outer surface of the tubing 8, said ring being provided externally with a conical portion 26a cooperating with the conical portion 6a and internally with a series of teeth or channels 26b adapted to be engaged in the outer wall of the tubing 8. The ring 26 has at least two longitudinal slots such as 26f which give it suitable elasticity for assembly on the tubing 8.

The ring 26 is adapted to come into abutment against a shoulder 6d of the rotary ring 6.

The split ring 26 which allows the tubing 8 to be assembled is driven during the period of locking of the tubing by the tubing itself, along the conical portion 6a, this tightening the ring 26 on the tubing by its teeth or channels 26b, so that the tubing is securely gripped between the channels or teeth 5a and the channels or teeth 26b. This powerful tightening effort is calculated as a function of the tubing, its thickness and its actual capacity of compression. The longitudinal stroke of the bush 5 and of the tubing 8, the angle of the conical portion 6a are provided to obtain the effort and compression necessary for the tubings used.

The bush 5 presents a large outer diameter preventing ejection thereof, and it may come into positive abutment axially in the ring 9.

The assembly as shown in FIGS. 14 and 15 is intended to allow a permanent axial thrust on part 8f of the tubing. Furthermore, this fitting may be used with tubings allowing a slight extension along 8e of the tubing, due to the presence of a tooth 5g of larger diameter than the teeth or channels 5a.

FIGS. 16 and 17 show another embodiment of the fitting in which the rotary ring 6 has been eliminated and the conical portion 7f is made directly in the nut 7, so that the ring 26 is in contact, by its conical portion 26a, with the conical portion 7f.

As in the preceding embodiment, the split ring 26 tightens the tubing 8 by its teeth 26b and has slots 26f.

The fitting shown in FIGS. 16 and 17 is used more particularly for assembling a tubing 8 which has virtually no possibility of extension.

The bush 5 comprises a flange 5f against which abuts the end 26e of the ring 26, the other end of which is adapted to abut against the shoulder 7e of the nut 7.

As in the preceding embodiment, the tubing 8 is manually mounted by force on the bush 5, whilst the boss 5b is engaged in the housing 30 and locking is effected by pulling on the tubing 8 which drives the bush 5 whose flange 5f comes into abutment against the end 26e of the ring 26 displacing said ring in the direction of the conical portion 7f of the nut 7, so that the end of the tubing 8 is held compressed between the bush 5 and the ring 26. Locking stops when the split ring 26 comes into abutment against the shoulder 7e.

In this case, the conical portion 7f and part 7h comprise an anti-adherent coating allowing easier rotation and locking of the tubing.

As the bush 5 extends by its tubular ferrule 5c in the bore 1e of the body, it is possible to push the bush axially by said ferrule 5c in order to proceed with locking. This operation may be effected manually, by means of a jack or a threaded part. In this case, locking is energetic and complete, which may be highly advantageous for the mass manufacture of high pressure flexible tubings.

Verification, checking and locking of manufactured flexible tubings may be effected by drawing on a traction machine.

The artisan will appreciate from the foregoing description and accompanying drawings, that the invention provides a fitting for connection to a tube 8 at a cut end portion thereof which fitting can be installed on the tube by hand manipulation and without using special tools. This fitting basically comprises in combination a hollow body 1, 7,; a tubular bushing 5 supported within said body and axially moveable relative thereto between an inward limit position and an outward limit position; and a ring 6. The bushing 5 has projections 5a disposed to internally grip the tube 8 to be connected to the fitting. The body 1, 7, and bushing 5 have mutually interfering parts 4b and 5b that coact when the bushing 5 is in its inward limit position to constrain the bushing against further inward axial movement and against rotation to aid the emplacement of the tube end portion into gripping engagement with the projections 5a of the bushing 5. The body has an inlet 7c allowing the insertion of the end portion of the tube 8 into the fitting for gripping engagement with the bushing. The ring 6 is within the hollow body and is positioned in circumferentially surrounding relation to the tube end portion inserted into the fitting. The ring has a conical surface portion 6a. The bushing 5 is axially moveable to an outward limit position at which the end portion of the tube 8 gripped by the bushing 5 is compressed between the bushing and the conical portion 6a of the ring 6 to establish a fluid-tight seal thereat.

What is claimed is:

1. A fitting for connection to a tube at a cut end portion thereof, which fitting comprises in combination a hollow body; a tubular bushing supported within said body and axially moveable relative thereto between an inward limit position and an outward limit position, said bushing having projections disposed to internally grip the tube to be connected to the fitting, said body and bushing having mutually interfering parts that coact when the bushing is in its inward limit position to constrain said bushing against further inward axial movement and against rotation to aid the emplacement of the tube end portion into gripping engagement with the projections of the bushing, said body having an inlet allowing the insertion of the end portion of the tube into the fitting for gripping engagement with the bushing; and a ring within said body and positioned in circumferentially surrounding relation to the tube end portion inserted into the fitting, said ring having a conical surface portion, said bushing being axially moveable to an outward limit position at which the end portion of the tube gripped by the the bushing is compressed between the bushing and the conical portion of said ring to establish a fluid-tight seal thereat, said ring, end portion of the tube, and bushing being rotatable in unison relative to said body, and constrained against further outward axial movement relative to said body when the bushing is in said outward limit position.

2. A fitting according to claim 1 wherein said hollow body includes a threaded portion and a nut connected to said threaded portion and having a bore defining said inlet allowing the insertion of the end portion of the tube.

3. A fitting according to claim 1 wherein said body has internal surfaces that engage said ring to immobilize same against axial movement and allow rotary movement thereof.

4. A fitting according to claim 1 including an annular seal disposed within said hollow body in sealing engagement with said bushing and the hollow body.

5. A fitting according to claim 1 wherein said mutually interfering parts include a flange on said bushing and a socket in said hollow body disposed to receive and engage said flange on the bushing.

6. A fitting according to claim 1 including an annular seal disposed within said hollow body in sealing engagement with said bushing, and resilient means disposed within said hollow body and acting upon said annular seal to resiliently bias same into sealing engagement with the bushing.

7. A fitting according to claim 1 wherein said ring has internal projections disposed to externally grip said tube end portion.

8. A fitting according to claim 1 wherein said ring has at least one slot that increases the elastic flexure of the ring to aid in establishing said fluid-tight seal.

9. A fitting according to claim 1 wherein said ring has a circumferentially inward extending surface portion disposed to effect a limited radial compression of the tube end portion over a limited axial zone thereof.

10. A fitting according to claim 1 wherein said ring has an anti-adherence surface coating that allows the tube end portion relative movement in contact therewith.

* * * * *